F. R. KENT.
HILLER.
APPLICATION FILED MAY 14, 1910.
1,011,350.
Patented Dec. 12, 1911.
2 SHEETS—SHEET 1.
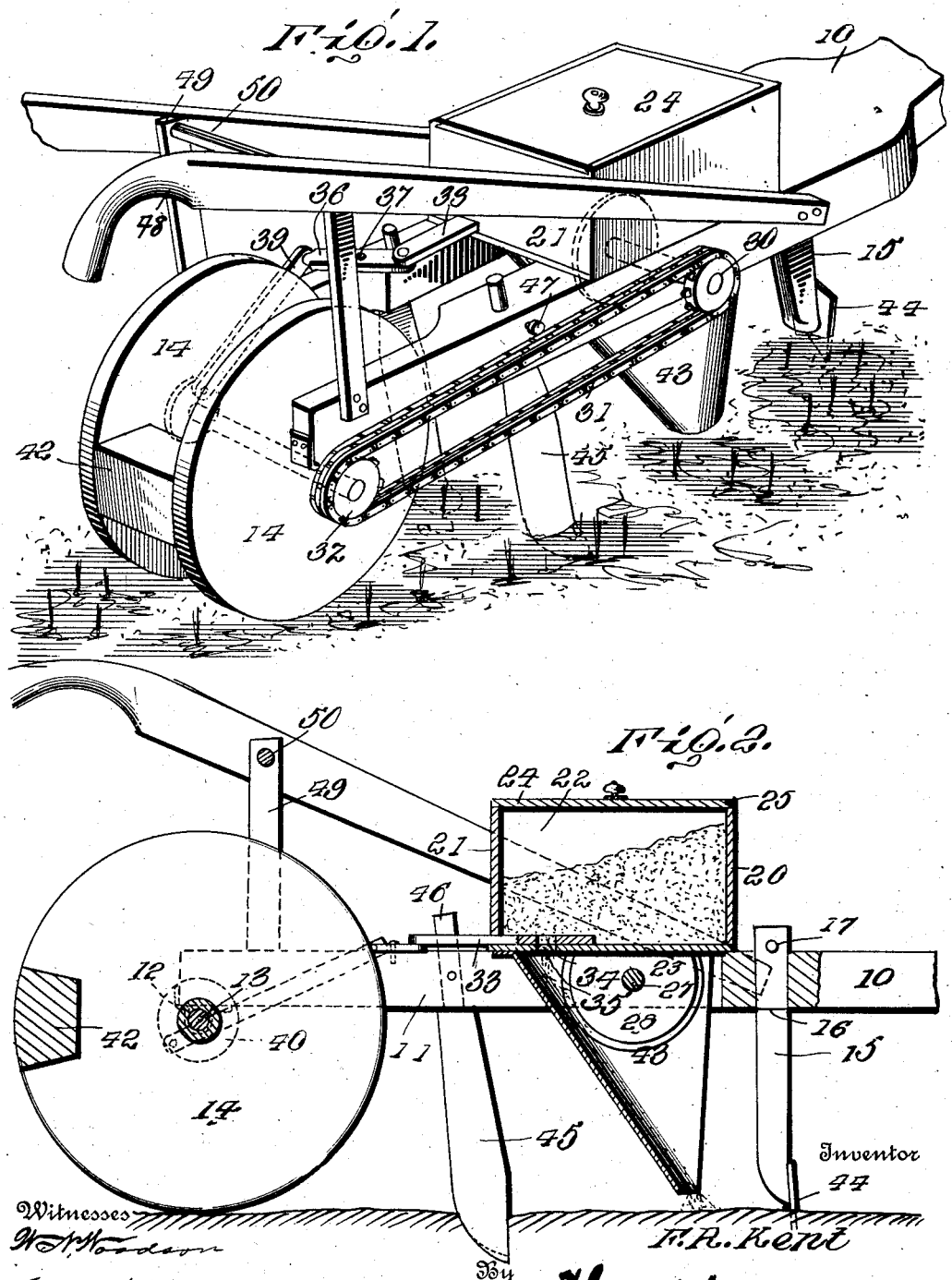

F. R. KENT.
HILLER.
APPLICATION FILED MAY 14, 1910.
1,011,350.
Patented Dec. 12, 1911.
2 SHEETS—SHEET 2.
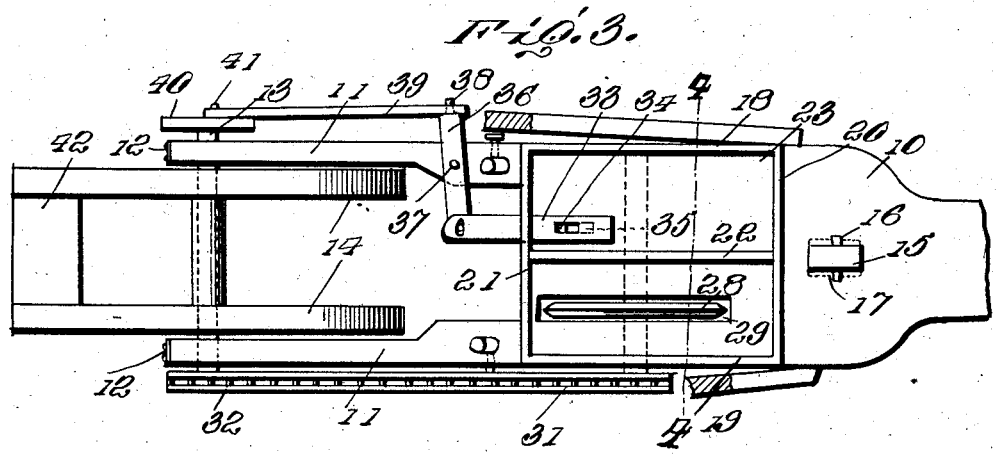
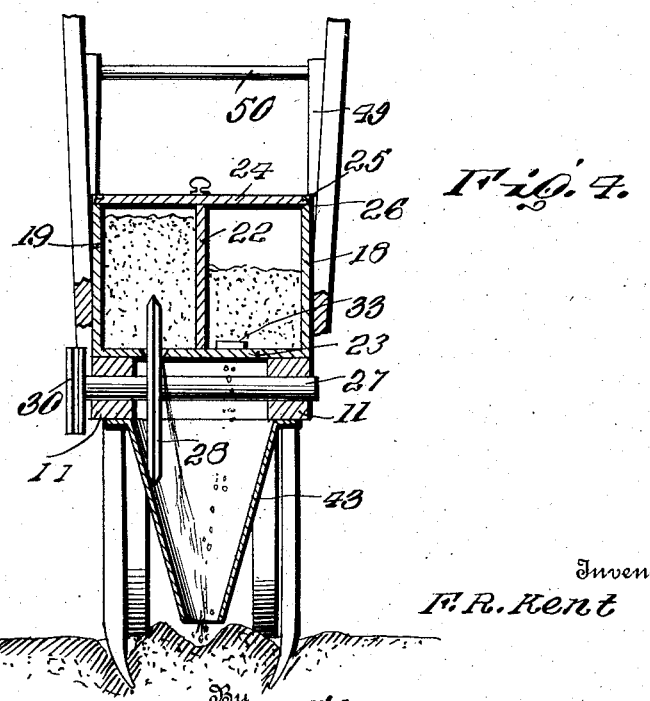
Witnesses
Inventor
F. R. Kent
By
Attorneys

UNITED STATES PATENT OFFICE.

FRANK R. KENT, OF MONTVALE, VIRGINIA.

HILLER.

1,011,350.  Specification of Letters Patent.  Patented Dec. 12, 1911.

Application filed May 14, 1910. Serial No. 561,379.

*To all whom it may concern:*

Be it known that I, FRANK R. KENT, citizen of the United States, residing at Montvale, in the county of Bedford and State of Virginia, have invented certain new and useful Improvements in Hillers, of which the following is a specification.

This invention relates to hillers and listers, and refers particularly to an improved machine of this character combining therewith a mechanism for carrying, mixing and dropping fertilizer and seed.

An object of this invention is to construct a machine adapted to hill or list land for all crops; as tobacco, tomatoes, corn, cotton, or the like, and one which may be used to distribute seed and fertilizer at the same time.

The machine is employed where hoes were formerly employed and where fertilizer was distributed by hand.

Another object of this invention is to provide a distributer with a shovel for forming a furrow, a spout arranged immediately behind the shovel to receive and mix the fertilizer and seed and to drop the same into the furrow, a pair of adjustable covering blades spaced rearwardly from the spout to close the furrow after the mixed seed and fertilizer have been deposited therein, a slide for intermittently feeding the seed to the spout, and a marker carried by and rotatable with the traction wheels at the rear of the machine and timed to press on the furrow at points where the seed has been deposited.

In the accompanying drawings, Figure 1 is a perspective view of the complete machine. Fig. 2 is a central longitudinal section through the machine. Fig. 3 is a top plan view of the machine, parts of the machine being broken away, and Fig. 4 is a transverse section of the machine on the line 4—4 of Fig. 3.

Corresponding and like parts are referred to in the following description and indicated in all the views of the accompanying drawings by the same reference characters.

Referring to the drawings the frame of the improved machine comprises a casting in the form of a plate 10 which is forked at its rear extremity to provide the side-bars 11. The rear extremities of the side-bars 11 are provided with bearings 12 which are carried against the under edges of the side-bars and support the opposite ends of the transverse shaft 13. A pair of spaced traction wheels 14 are keyed to the shaft 13 and are positioned against the inner faces of the side-bars 11. The plate 10 is centrally apertured to receive the upper end of a standard 15. The standard 15 is slightly reduced at its upper end to pass through the plate 10 and to provide a shoulder 16 to seat against the under face of the plate 10 and to hold the standard rigidly in position. A pin 17 is passed through the upper end of the standard 15 and against the upper face of the plate 10 to hold the standard upon the frame.

On the side-bars 11 is mounted a hopper, the same comprising the sides 18 and 19 and the front and rear end-walls 20 and 21. The hopper is provided with a partition 22 arranged centrally and longitudinally therein to divide the hopper into two compartments which are designed to contain seed and fertilizer respectively. The bottom 23 of the hopper rests across the upper faces of the side-bars 11, meeting the rear edge of the plate 10. A sliding cover 24 is positioned over the hopper and is provided about its edges with a tongue 25 to fit within a corresponding groove 26 formed about the inner walls of the hopper and adjacent its upper edge. The side-bars 11 carry a shaft 27 transversely beneath the hopper upon which is rigidly secured a stirring disk 28. The disk 28 is carried adjacent one end of the shaft 27 and projects upwardly through an opening 29 formed through the bottom 23 adjacent the side 19. One end of the shaft 27 extends beyond the side-bar 11 and carries a sprocket 30 receiving a chain 31 to actuate the shaft 27. The chain 31 passes backwardly to a sprocket 32 mounted upon an extension of the transverse shaft 13. The slide 33 is passed through a slot formed in the rear wall 21 of the hopper adjacent the bottom 23 and the side 18, the slide 33 having an opening 34 to register with a corresponding opening 35 formed through the bottom 23 to admit of the passage of seed through the bottom. The slide 33 extends backwardly from the wall 21 and is loosely connected upon the inner end of the swinging arm 36. The arm 36 is mounted upon a pin 37 extending upwardly from the adjacent side-bar 11 and passing through the central portion of the arm 36. The outer end of the arm 36 is reduced to form a stud 38 for loose engagement through the forward end of the pitman 39. The shaft 13 carries a disk 40 upon its outer end, and outwardly of the side-bar 11, provided with a wrist-pin 41 to which is attached the rear end of the pitman 39. The traction wheels 14 are of such a size that one revolution of the same completes the stroke of the slide 33 so as to make one deposit of seed from the hopper to each revolution of the traction-wheels. The marker 42, in the form of a block, is secured between the wheels 14 and adjacent their peripheries, and is adapted to strike the ground at the point where the seed has been deposited from the hopper.

A downwardly tapering spout 43 is carried against the under faces of the side-bars 11 immediately beneath the hopper and in alinement with the standard 15. The rear wall of the spout extends downwardly and forwardly to direct the mixed fertilizer and seed upon the ground immediately behind the standard 15. The standard 15 carries a suitable shovel 44 upon its lower end for the purpose of forming the furrow into which the fertilizer and seed drop.

A pair of covering blades 45 depend from the side-bars 11, the same being reduced and rounded at their upper ends to provide shanks 46 passing through the side-bars 11 to admit of the turning of the blades 45 into various angles. Set-screws 47 are carried through the outer edges of the side-bars 11 to engage with the shanks 46 and to rigidly hold the covering blades 45 in their adjusted position. A pair of handles 48 are secured against the outer edges of the side-bars 11 adjacent their forward ends and passed upwardly and rearwardly against the sides of the hopper.

Braces 49 extend upwardly from the rear ends of the side-bars 11 and rest against the inner sides of the handles 48 to which they are secured by a cross-bar 50.

In the operation of the machine a quantity of fertilizer is deposited in the pocket of the hopper formed between the side 19 and the partition 22 and a quantity of seed is disposed in the opposite pocket formed between the partition 22 and the side 18. As the machine is drawn forwardly the shovel 44 opens the furrow and the traction wheels 14 are rotated. The movement of the traction wheels is imparted to the shaft 27 and causes the rotation of the disk 28 to feed the fertilizer through the slot or opening 29. The pitman 39 swings the arm 36 to reciprocate the slide 33 over the bottom 23. This movement registers the openings 34 and 35 when the slide 33 is moved inwardly and drops a quantity of seed into the spout 43.

The fertilizer is fed constantly from the hopper and the seed drops intermittently and mixes with the fertilizer as it falls through the spout and over the inclined rear wall of the same. After the fertilizer and the seed have been deposited in the furrow, the covering blades 45 return the earth into the furrow and close the same. The marker 42 is so positioned between the wheels 14 that it strikes the hill which is formed by the covering blades at points beneath which the seed has been deposited from the spout 43.

From a machine of this construction it will be observed that after the seed has been deposited and covered, the marker indicates upon the ground the points at which the seed has been deposited.

The covering blades 45 are reduced in thickness at their lower ends and are curved inwardly to a slight degree at their rear edges so as to direct the earth inwardly over the fertilizer and seed which have been deposited from the lower end of the spout 43. The drive-wheels 14 are spaced slightly inward of the rear edges of the covering blades 45 and tend to pack the earth which has thus been formed by the blades 45. The machine can thus be employed for distributing fertilizer alone, or for fertilizer and seed, or may be employed to simply hill or list the earth for various crops.

Having thus described the invention what is claimed as new is:—

A planter including a frame having its rear portion forked to provide side bars, a hopper supported on the side bars at the front end of the fork, a standard secured to and depending from the frame in front of the fork, a furrow-turning shovel provided on the lower end of the standard, a spout secured to and depending from the side bars below the hopper and in longitudinal alinement with the standard, the hopper being formed in its bottom with a slot communicating with the spout, a transverse shaft journaled in the side bars and extending across the upper portion of the spout below the bottom of the hopper, a stirring disk fixed on said shaft and projecting upwardly through the slot into the interior of the hopper, a second transverse shaft journaled in the rear ends of the side bars, a traction wheel secured on the second shaft between the side bars, means driven by the second shaft for rotating the first shaft, and a pair of co-acting covering blades secured to and depending from the side bars at points between the said transverse shafts and behind the spout.

In testimony whereof, I affix my signature in presence of two witnesses.

FRANK R. KENT. [L. S.]

Witnesses:
C. C. WILLIAMSON,
W. H. BUFORD.

Copies of this patent may be obtained for five cents each, by addressing the "Commissioner of Patents, Washington, D. C."